United States Patent [19]

Mudge et al.

[11] Patent Number: 4,575,062

[45] Date of Patent: Mar. 11, 1986

[54] COUPLING CONSTRUCTION AND CLAMP THEREFOR

[75] Inventors: Dennis Mudge, Cumberland, R.I.; William A. Wood, Attleboro, Mass.

[73] Assignee: American Machine & Science, Inc., Park Ridge, Ill.

[21] Appl. No.: 647,715

[22] Filed: Sep. 5, 1984

[51] Int. Cl.$^4$ ............................................. B23Q 3/18
[52] U.S. Cl. ....................................................... 269/64
[58] Field of Search ................. 269/57, 63, 64, 91–94; 51/216 ND, 216 H; 279/5; 74/813 R

[56] References Cited

U.S. PATENT DOCUMENTS 3,049,032  8/1962  Schabot ................................ 269/64
3,961,780  6/1976  Saj ........................................ 269/64

*Primary Examiner*—Robert C. Watson
*Attorney, Agent, or Firm*—Salter & Michaelson

[57] ABSTRACT

A coupling construction and a clamp therefor are disclosed which are operable in a workholding system for securing and holding a workpiece at a work station during a machining operation. The coupling which is preferably of substantially circular configuration and preferably comprises a substantially circular receiver which is securable at the work station, a carrier to which a workpiece is securable and which is receivable in mating relation with the receiver, and a plurality of the clamps which are operative for securing the carrier to the receiver in a coupled position wherein the carrier is received in mating relation with the receiver. The clamps are preferably disposed within the interior of the coupling and a drive means is also preferably provided within the interior of the coupling for manipulating the clamps between unclamped positions thereof and clamped positions thereof wherein they clampingly engage the carrier and the receiver to maintain the coupling in the coupled position. The structural features of the coupling make it particularly adapted for construction with a reduced axial dimension so that it can be effectively utilized in a workholding system without occupying a substantial portion of the machining envelope of a machining apparatus.

36 Claims, 10 Drawing Figures

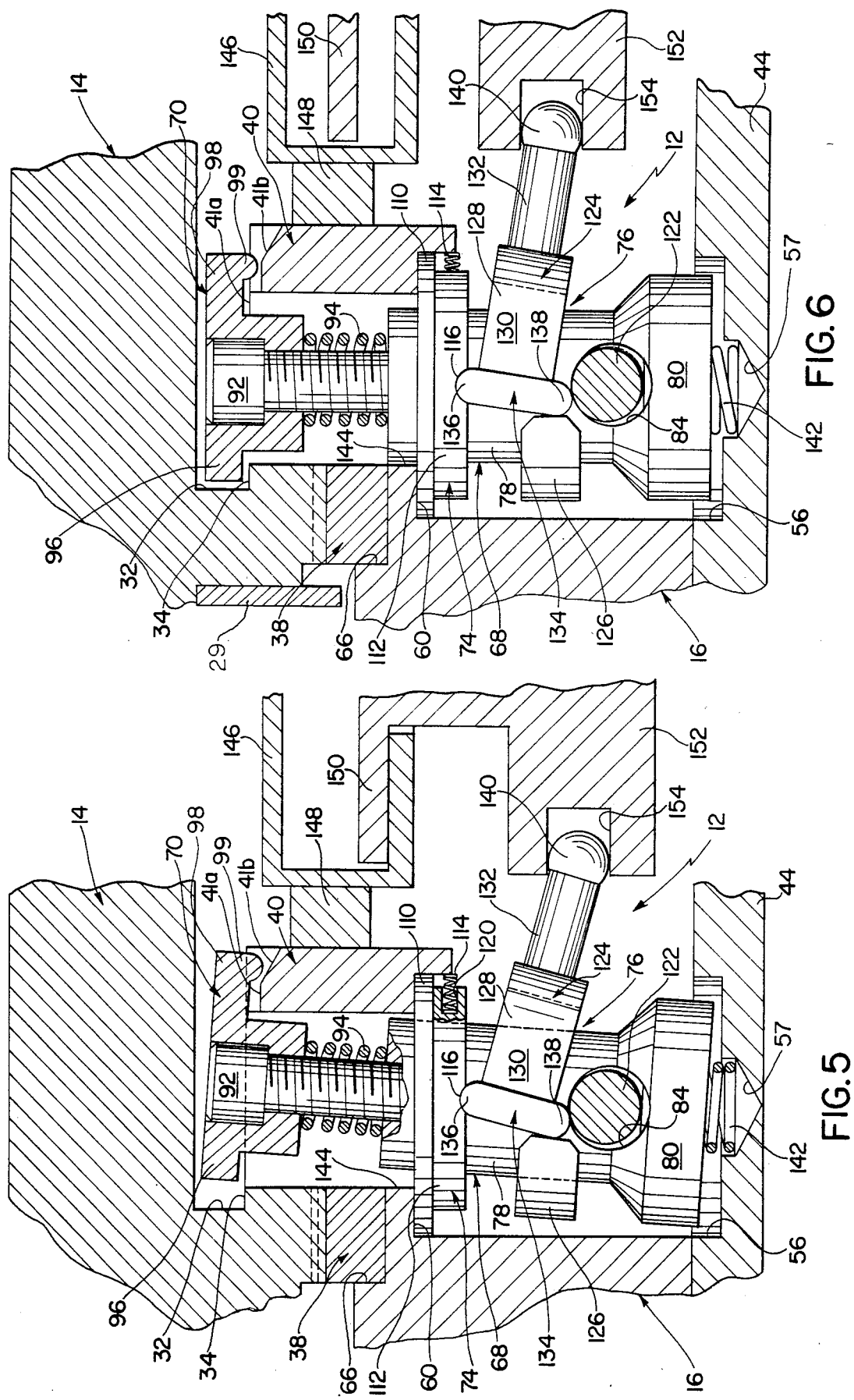

COUPLING CONSTRUCTION AND CLAMP THEREFOR

BACKGROUND AND SUMMARY OF THE INVENTION

The instant invention relates to the machine tool industry and, more particularly, to a coupling which is particularly adapted for use in a workholding system, and to a clamp for securing receiver and carrier portions of the coupling together in a coupled position.

Frequently during the manufacture of precision parts, such as parts for aircraft engines and the like, machining operations are carried out in a series of steps utilizing different machining apparatus at a series of different work stations. Further, in many cases, substantial quantities of identical parts are produced utilizing the same series of steps at the work stations. In order to achieve the necessary precision in machining operations of this type, each time a workpiece is transferred to a different work station, the workpiece must be precisely set up or installed and secured in a workholding apparatus at the station. Frequently, set-up operations of this type are very time consuming because of the high degree of precision which is required to properly orient and secure a workpiece for a machining operation. In fact, it has been found that frequently set-up operations of this type consume substantially greater quantities of time than the actual machining operations at the work stations. As a result, substantial quantities of operational time on highly expensive machining apparatus are frequently consumed by set-up and adjustment procedures, rather than actual machining operations.

The instant invention provides a novel coupling construction which is operable in a workholding system for substantially reducing the amount of time which is required for set-up and adjustment procedures at work stations before machining operations can be commenced. Specifically, the coupling construction of the instant invention comprises a carrier and a receiver which are receivable in a coupled position, and a clamp which is operable for securing the carrier and the receiver in the coupled position. The receiver and the carrier are preferably both of generally circular configuration, and they are preferably formed with multi-toothed coupling surfaces thereon which are of complementary configurations and which are receivable in interfitting face-to-face mating relation with each other. The carrier and the receiver are further formed with clamping surfaces thereon, which face in generally the opposite directions from the respective coupling surfaces thereof, and the clamp of the coupling is operative for engaging the clamping surfaces of the receiver and the carrier for releasably securing them in the coupled position. The coupling is preferably formed with a central open area, and preferably a plurality of the clamps are provided and disposed in a substantially circular array in the open area for releasably securing the carrier on the receiver. Further, the clamping surfaces of the carrier and the receiver which preferably face generally opposite to each other and substantially parallel to the coupling surfaces of the coupling are located so that they communicate with the central open area, and hence the clamps are preferably disposed entirely within the open area. In addition, preferably the clamping surfaces and the clamps are disposed and configured so that when clamping pressures are applied to the clamping surfaces, they are applied substantially along clamping axes which are substantially perpendicular to and intersect the coupling surfaces. As a result of these structural features, the entire coupling, comprising the carrier, the receiver, and the clamps, can be constructed in a reduced profile so that the coupling can be received in a machining apparatus without occupying a substantial portion of the machining envelope of the apparatus, i.e. the area of the apparatus where machining is performed. Further, since the clamping pressures are applied along axes which are substantially perpendicular to and intersect the coupling surfaces, the clamping pressures are, in effect, applied directly to the coupling surfaces to optimize the clamping effect.

The clamp of the instant invention which is adapted for use in securing the coupling in the coupled position preferably comprises a clamp body having a central axis, a clamping member which is attached to the body and extends generally outwardly therefrom, a slide member which is slidably received on the body so that it is slidable a distance with respect thereto in a direction which is substantially parallel to the axis of the body, spring means which is operable substantially along the axis of the body for biasing the clamping member toward the slide member, and actuating means which communicates with the slide member and with the spring means for moving the clamping member to a clamping position and for loading the spring means to bias the clamping member toward a clamping surface. More specifically, when the clamp is assembled in the coupling the actuating means communicates with the slide member and with the spring means for moving the clamping member from a position wherein it is inwardly offset from the clamping surface of the carrier to a position wherein it is substantially aligned with but disengaged from the clamping surface of the carrier. The actuating means is further operative for moving the clamp from the aligned but disengaged position thereof to a position wherein the clamping member is in engagement with the clamping surface of the carrier and for thereafter loading the spring means to bias the carrier towards the receiver. Further, the actuating means of the clamp is positionable in a locked position wherein substantial clamping pressures are maintained on the carrier and on the receiver until the clamp is manually moved to an unclamped position. The clamp is preferably received and secured in the receiver so that it is maintained in a position wherein it is in engagement with the clamping surface of the receiver, and wherein the clamping member of the clamp is engageable with the clamping surface of the carrier to clampingly secure the carrier to the receiver. Further, the clamp is preferably operable by manipulating a lever arm of the actuating means for moving the clamping member and for biasing it toward the carrier clamping surface. In the preferred embodiment of the clamp, the actuating means is operative for moving the clamp between the above described positions with a double toggle action, wherein the actuating means is pivotable about a first axis which is substantially transverse to the axis of the body for moving the clamping member from the inwardly offset position to the aligned disengaged position. After the clamping member has been moved to the aligned disengaged position, the actuating means of the clamp is pivotable about a second axis which is substantially transverse to the axis of the body for moving the clamping member into engagement with the carrier clamping surface and for thereafter loading the spring means of the clamp to apply clamping pressures to the clamping surfaces of the carrier and the receiver. The spring means of the clamp, which is operative for biasing the carrier and the receiver together, preferably comprises one or a plurality of Bellville washers which are compressed when the lever arm of the actuating means is pivoted to load the spring means. As a result of loading the Bellville washers with the actuating means, substantial pressures can be applied to the clamp to firmly secure the carrier and the receiver in biased engagement in the clamped position.

In the preferred embodiment of the coupling, wherein a plurality of clamps are provided for securing the carrier and the receiver in the clamping position, a drive means is provided which communicates with the lever arms of the individual clamps so that the clamps can be simultaneously actuated for movement between the various above-described positions thereof. As a result, unnecessary torques and stresses in the coupling can be avoided, and the carrier and the receiver can be quickly and efficiently clamped and unclamped as desired. Preferably, the drive means is located in the central open area in the receiver, and preferably, it is remotely operable either mechanically or hydraulically.

Accordingly, because of the operational and structural features of the coupling construction and the clamp of the instant invention as hereinabove set forth, the coupling can be effectively utilized to provide a reliable and accurate workholding system. The coupling can be effectively embodied in a low-profile construction, wherein the clamps are disposed in the interior of the coupling, and hence the coupling can be utilized in a workholding system without occupying a substantial portion of the working envelope of a machining apparatus. Therefore, the capabilities and capacities of a machining apparatus are not substantially limited when the coupling is utilized in combination therewith. For utilizing the coupling of the instant invention in a workholding system to carry out a procedure wherein a plurality of substantially identical workpieces are formed in a series operation and wherein each piece is machined at a series of different work stations, an assembly comprising a receiver and a plurality of the clamps is secured at each of the work stations, and each of the workpieces is attached to a different carrier. In order to perform the first machining operation at a work station, a carrier with a workpiece attached thereto is secured to the receiver at the work station and the usual set-up procedures are performed in order to properly orient and position the coupling and the workpiece at the work station before a machining operation can be commenced. However, after the machining apparatus at the work station has been set up to accommodate one workpiece on a coupling at the station, a second workpiece mounted on a second carrier can be substituted for the first workpiece and carrier and clamped to the receiver at the work station. Because of the highly accurate and reliable manner in which the carrier and the receiver are receivable in coupled relation, the set-up procedures which were required when the first workpiece was installed at the work station are unnecessary in subsequent workpiece installations at the same station. Therefore, after initial set-up operations have been completed at each work station, workpieces can be moved from work station to work station, and machining operations can be performed on the workpieces without substantial further set-up operations at the stations. As a result, substantial savings in time are realized in the overall machining operation, and workpieces can be produced at a substantially increased rate. Further, it has been found that the coupling of the instant invention can be effectively utilized in workholding systems for a variety of different machining apparatus, including milling machines and rotary machining apparatus, such as lathes and grinders. Hence, the coupling has substantial application in a variety of machining operations which can be performed in a wide variety of manufacturing industries.

Apparatus representing the closest prior art to the instant invention of which the applicant is aware is disclosed in the U.S. Pat. No. to PERRY 3,540,566. However, this apparatus is not adapted for a low-profile construction, and hence when it is utilized in a workholding system it occupies a substantial portion of a machining enelope. The apparatus disclosed in this patent also does not embody or suggest the operational and structural features of the coupling construction and clamp of the instant invention as hereinabove described, and hence this reference is believed to be of only general interest.

Accordingly, it is a primary object of the instant invention to provide a coupling construction which can be effectively adapted for use in a workholding system.

Another object of the instant invention is to provide an effective substantially circular coupling construction which can be embodied with a reduced axial dimension.

A still further object of the instant invention is to provide a clamp which can be effectively utilized in a coupling for a workholding system.

A still further object of the instant invention is to provide a means of reducing the set-up time for machining operations wherein a plurality of substantially identical workpieces are sequentially machined at a series of different work stations.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIGS. 5 through 9 illustrate the sequential positions of the clamp as it is operated to secure the carrier and receiver portions of the coupling in a coupled position.

DESCRIPTION OF THE INVENTION

Figure 1:
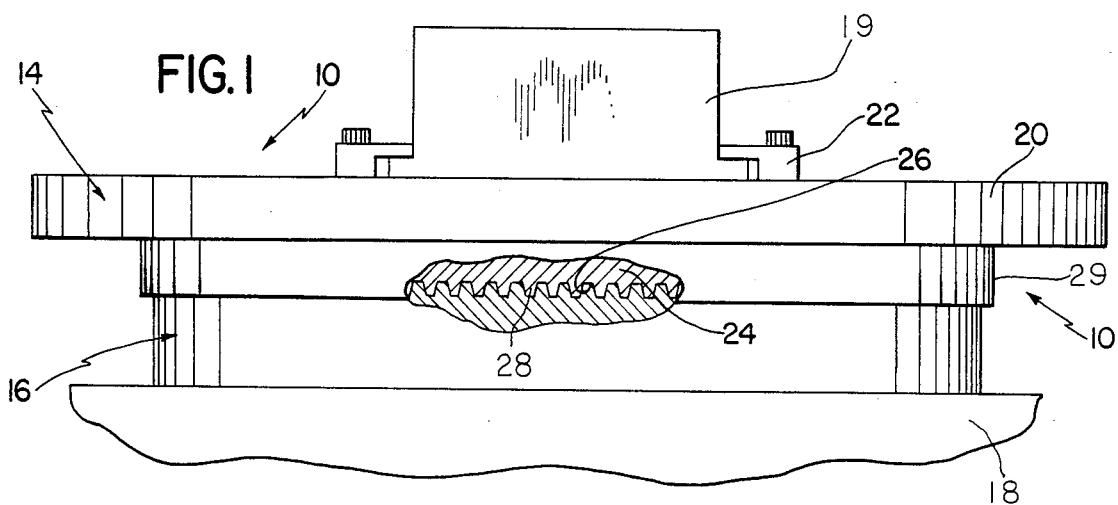
FIG. 1 is a side elevational view of the coupling of the instant invention in the coupled position.
Figure 2:
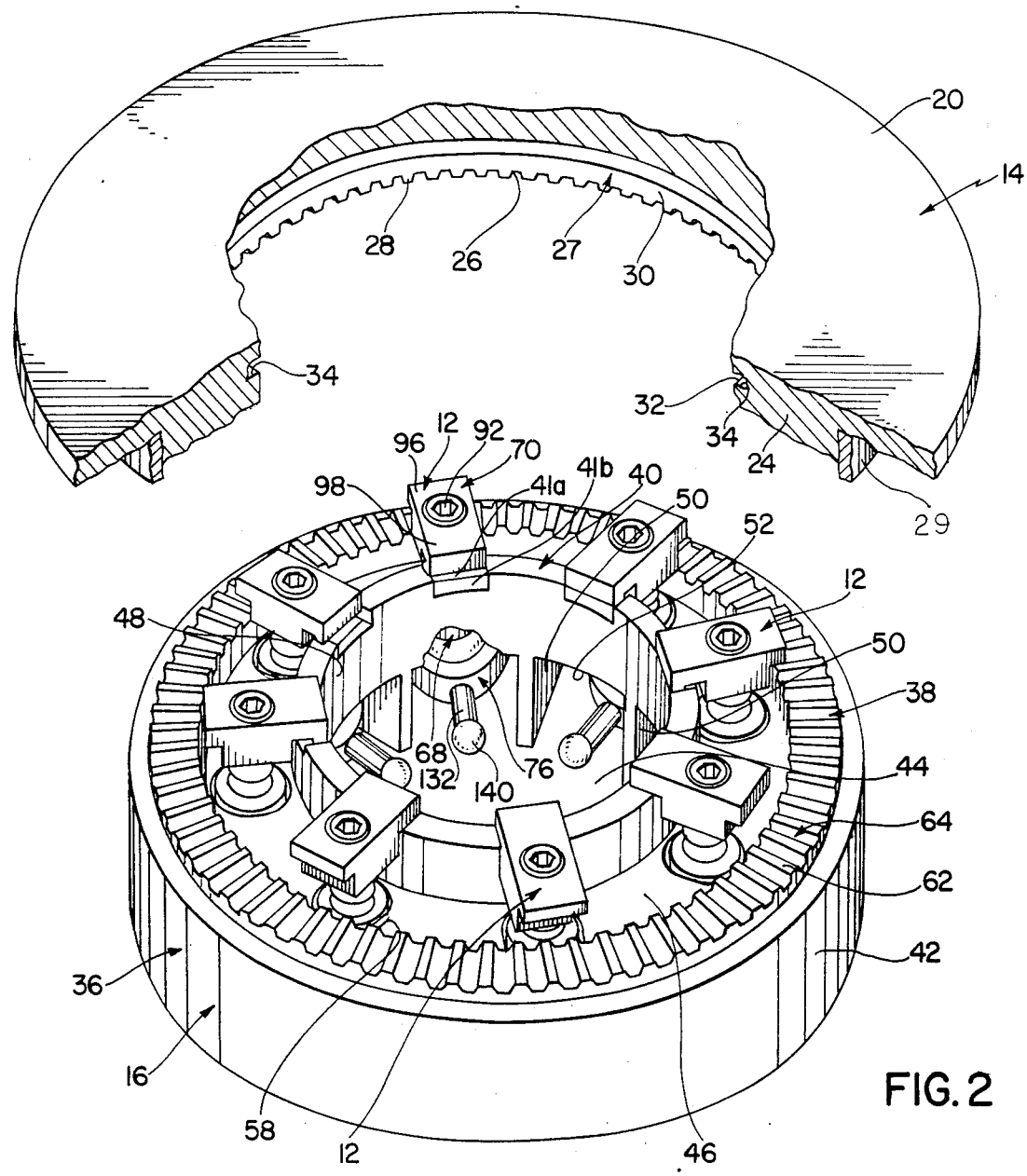
FIG. 2 is a fragmentary exploded perspective view thereof without the drive assembly of the coupling.

Referring now to the drawings, the coupling of the instant invention is illustrated and generally indicated at 10 in FIGS. 1 and 2, and the clamp of the instant invention, which is operable in the coupling 10, is illustrated and generally indicated at 12 in FIGS. 3 through 10. The coupling 10 is operable in a workholding system for holding and securing a workpiece during a machining operation and it generally comprises a carrier generally indicated at 14, a receiver generally indicated at 16, a plurality of the clamps 12, and a drive assembly 17 (illustrated in FIGS. 5-9). For use of the coupling 10 in a workholding system, the receiver 16 is secured to a machining apparatus 18 and a workpiece, such as the workpiece 19 illustrated in FIG. 1, is secured to the carrier 14. The carrier 14 is then secured to the receiver 16 in the coupled position illustrated in FIG. 1 with the clamps 12 to secure the workpiece 19 to the machining apparatus 18.

The carrier 14 is preferably formed in a substantially circular configuration with a reduced axial dimension, and it has an enlarged workpiece mounting portion 20 on which the workpiece 19 is secured with holding brackets 22. The carrier 14 further includes a reduced concentrically disposed substantially circular interfacing or mating portion 24 on which a coupling surface 26 is formed. The surface 26 faces generally perpendicular to the axis of the carrier 14, and it is defined by a substantially circular ring 27 of coupling teeth 28 which are substantially radially oriented and are preferably of either Curvic (Gleason T.M.) or Hirth configurations. An annular protector/guide ring 29 is received on the outer periphery of the mating portion 24, and it extends a distance beyond the teeth 28 in a direction substantially parallel to the axis of the carrier 14 so that it protects the teeth 28 when the carrier 14 is laid on a supporting surface so that the ring 27 is facing the supporting surface. Disposed radially inwardly from the ring 27 is an open area 30, and an inwardly facing channel 32 extends substantially radially outwardly from the open area 30 and defines a clamping surface 34 which faces generally away from the coupling surface 26 and is preferably in a plane which is substantially perpendicular to the axis of the carrier 14. Further, the clamping surface 34 which actually defines a plurality of clamping surface areas for the clamps 12 is preferably substantially aligned with the coupling surface 26 so that when a substantially perpendicular clamping force is applied to the clamping surface 34, the clamping force is applied along a clamping axis which is substantially perpendicular to and intersects the coupling surface 26.

The receiver 16 is also preferably of substantially circular configuration, and it comprises a housing portion generally indicated at 36, in which a plurality of the clamps 12 are mounted, a multi-toothed coupling ring 38, and a substantially circular shoulder ring 40. The shoulder ring 40 is disposed concentrically and inwardly with respect to the coupling ring 38, and it has a plurality of spaced shoulder notches 41 therein, the notches 41 each having shoulder surfaces 41a which are substantially perpendicular to the axis of the receiver 16 and beveled surfaces 41b which extend angularly inwardly from the surfaces 41a. The housing portion 36 is defined by an annular outer wall 42, a first end wall 44 which extends inwardly from the outer wall 42 and is substantially perpendicular to the axis of the coupling 10, and a second end inner wall 46 which is spaced from and substantially parallel to the first end wall 44 and extends inwardly from the outer wall 42 to the ring 40. The shoulder ring 40 projects a distance from the second end wall 46 in a direction substantially parallel to the axis of the coupling 10 and it defines a substantially circular opening 48 which provides an access to the interior of the housing portion 36. Disposed within the interior of the housing portion 36 is a plurality of partitions 50 which extend substantially radially inwardly from the outer wall 42 to the perimeter of the cylinder defined by the inner surface of the shoulder ring 40 and define a plurality of compartments 52 in the receiver 16. Slots 54 (illustrated in FIG. 10) are provided in the partitions 50 and extend from the first end wall 44 toward the second end wall 46 in substantially parallel relation to the axis of the receiver 16, and substantially circular recesses 56 (illustrated in FIGS. 5 through 10) are provided in the first end wall 44 and disposed in the compartments 52. Apertures 58 having elongated sectional configurations extend through the second end wall 46 into the compartments 52, the apertures 58 being generally aligned with the recesses 56 in the respective compartments 52 and being disposed so that the elongate dimensions thereof are substantially radially oriented. Formed on the underside of the second end wall 46 adjacent the apertures 58 are substantially circular flat clamping surfaces 60 which are substantially perpendicular to the axis of the receiver 16 and face generally away from the multi-toothed ring 38. The multi-toothed ring 38 comprises a plurality of teeth 62 which define a coupling surface 64 of the receiver 16 which is substantially perpendicular to the central axis thereof. The teeth 62 are substantially radially oriented on the surface 64, and they are formed so that the surface 64 is of substantially complementary configuration to the surface 26 and so that therefore the teeth 62 are receivable in mating or interfitting relation with the teeth 28 of the multi-toothed ring 27 on the carrier 14. Preferably the outermost portions of the surfaces 60 are aligned with the ring 38 so that when substantially perpendicular clamping forces are applied to the outermost portions of the surfaces 60, the forces are applied along clamping axes which intersect the coupling surface 64 in substantially perpendicular relation. In the receiver 16 as herein embodied, the ring 38 is formed as an insert which is received in a circular channel 66 formed in the second end wall 46, although other embodiments of the coupling, wherein the ring 38 is integrally formed with other portions of the receiver 36 are contemplated.

Each of the clamps 12 comprises a body 68, a clamping member assembly generally indicated at 70 which is attached to the body 68, a spring assembly generally indicated at 72, which is operative in a direction substantially along the axis of the body 68, a slide member assembly generally indicated at 74 which is slidably received on the body 68, and an actuator assembly 76. The actuator assemblies 76 communicate with the slide member assemblies 74 and the spring assemblies 72 for moving the clamps 12 from positions wherein the clamping member assemblies 70 thereof are in inwardly offset disengagement from the clamping surface 34 of the carrier 14 to positions wherein the clamping member assemblies 70 are in clamping engagement with the clamping surface 34.

Figure 10:
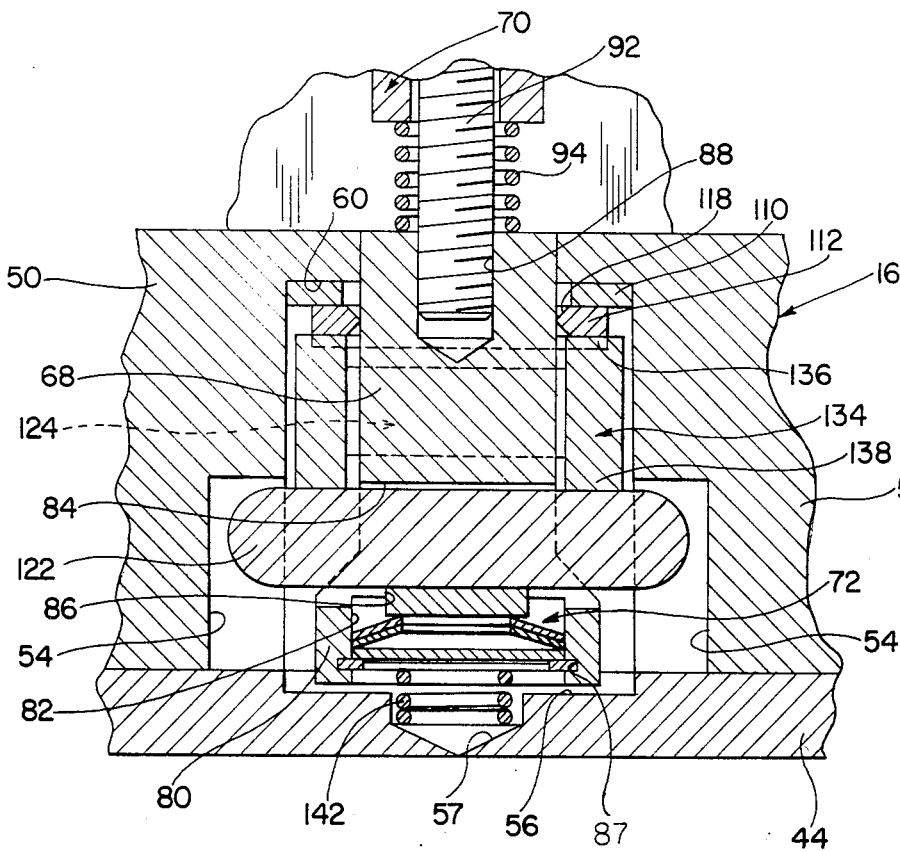
FIG. 10 is a sectional view taken along line 10—10 in FIG. 8.

The clamp bodies 68 each comprises a cylindrical main portion 78 and an enlarged substantially hollow lower skirt portion 80. As illustrated in FIG. 10, enlarged, substantially axial bores 82 extend into the skirt portions 80 from the terminal ends of the respective bodies 68, transverse apertures 84 extend through the upper portions of the skirt portions 80 and the lower portions of the main portions 78, and substantially axial passages 86 provide communication between the bores 82 and the respective apertures 84. Circular inner grooves 87 are formed in the bores 82 closely spaced from the ends of the skirt portions 80, and threaded axial apertures 88 extend downwardly from the upper ends of the clamp bodies 68.

The clamping member assemblies 70 each comprise a clamping element 90, a threaded screw 92 which extends through the respective clamping element 90 and is threadedly received in the respective aperture 88 for adjustably securing the clamping element 90 to the respective body 68, and a positioning spring 94 which engages the respective body 68 and the respective clamping element 90 to maintain the element 90 in an outermost position on the respective screw 92. Each of the elements 90 is formed so that it includes a clamping arm 96 which is engageable with the clamping surface 34 of the carrier 14, and a shoulder arm 98 having a shoulder knob 99 thereon which is engageable with the shoulder ring 40 when the clamping arm 96 is in engagement with the clamping surface 34. Further, the shoulder arms 98 and the shoulder ring 40 are formed so that when the respective clamping arms 96 are in engagement with the clamping surface 34 and the shoulder knobs 99 are in engagement with the shoulder ring 40, the shoulder knobs 99 engage the adjacent shoulder surfaces 41a, and so that as a result the clamping elements 90 are maintained in substantially perpendicular relation to the screw 92 to apply substantially perpendicular forces to the clamping surface 34.

Figure 3:
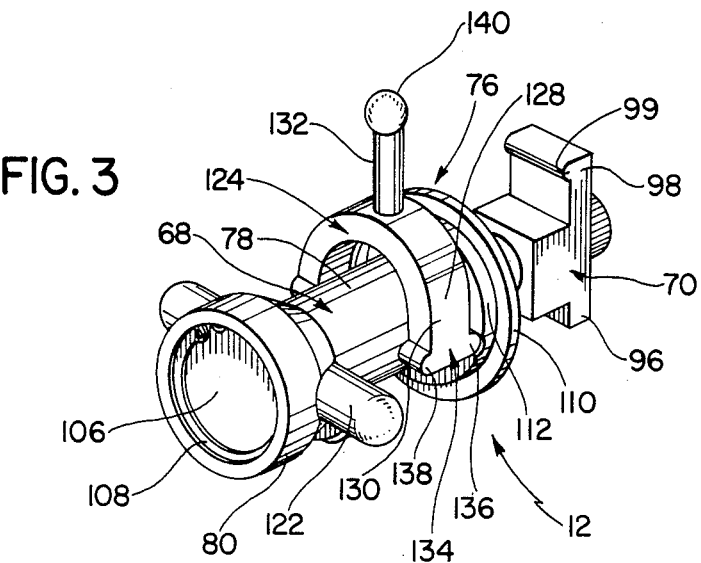
FIG. 3 is a perspective view of one of the clamps of the coupling.
Figure 4:
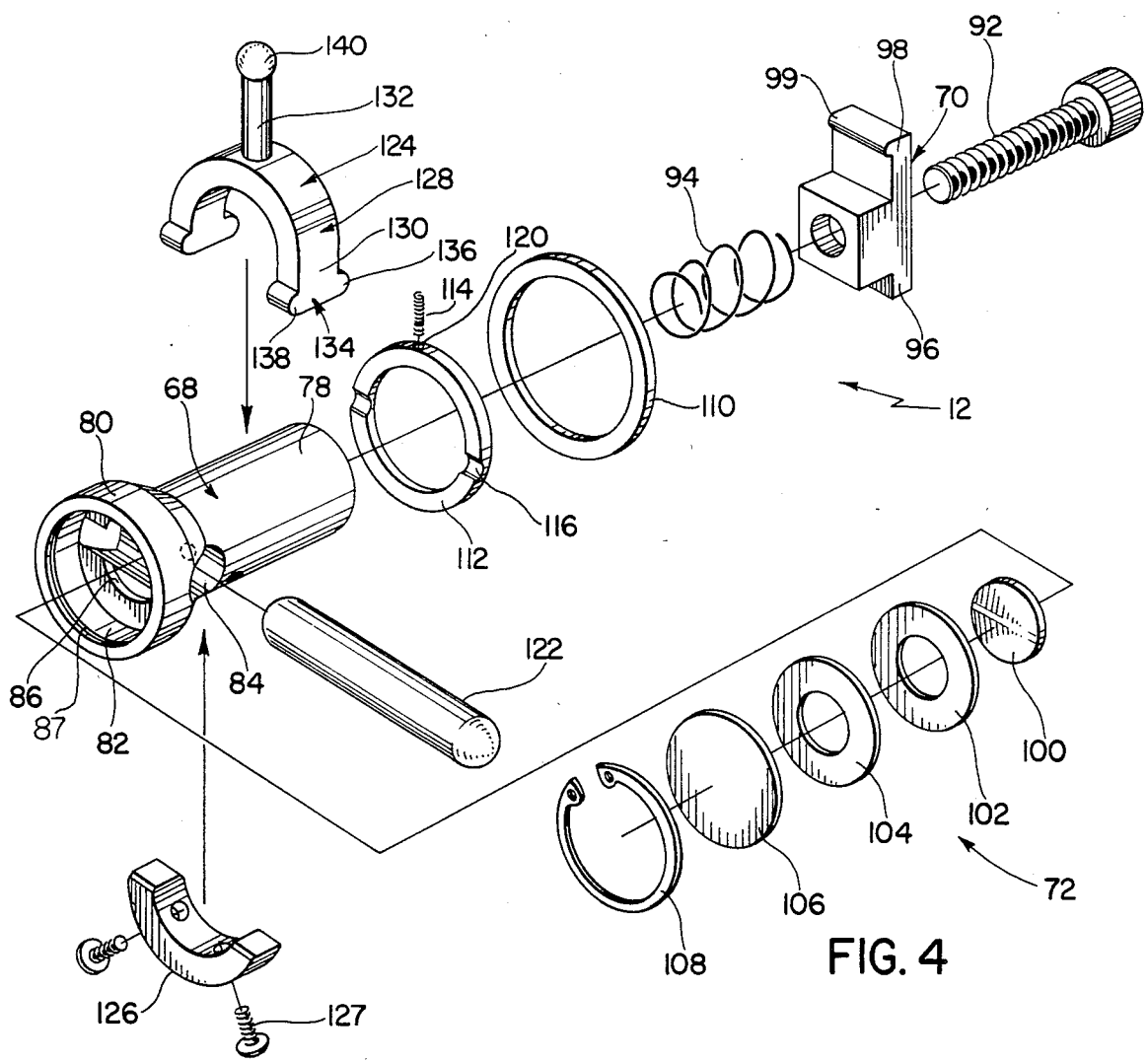
FIG. 4 is an exploded perspective view of the clamp.
Figure 7:
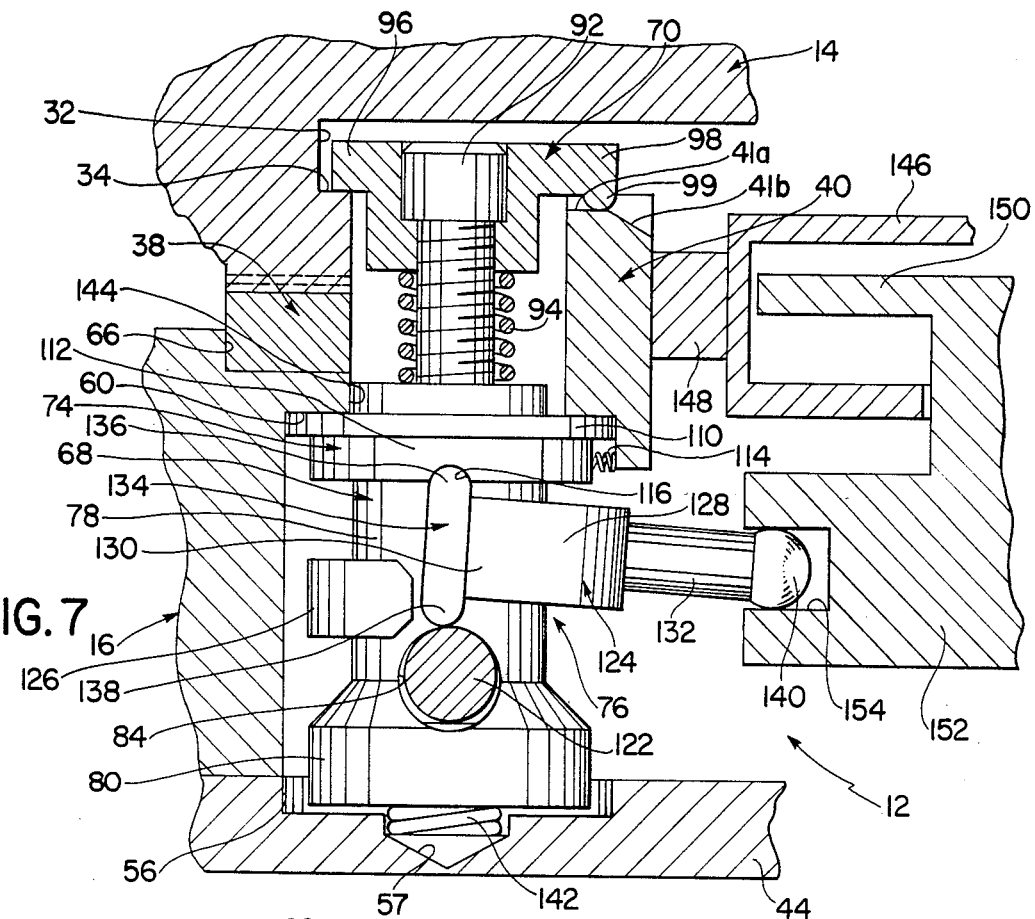

The spring assemblies 72, one of which is illustrated in FIGS. 3 and 10, are operative for biasing the respective clamping member assemblies 70 towards the respective slide member assemblies 74. Each of the spring assemblies 72 comprises an upper disc 100, a pair of Bellville washers 102 and 104, a lower support disc 106, and a snap-ring 108. The discs 100 are slidably received in the respective apertures 86, and the Bellville washers 102 and 104 are received in the bores 82 so that the central portions of the washers 102 engage the adjacent discs 100 and so that the washers 102 and 104 extend angularly outwardly and slightly toward the terminal ends of the skirt portions 80. The support discs 106 are received in the respective bores 82 so that the washers 102 and 104 are captured between the respective discs 100 and 106, preferably in partially loaded dispositions, and the snap-rings 108 are received in the grooves 87 to retain the discs 106 in the desired positions in the bores 82. Accordingly, when a force is applied to one of the the discs 100 so that it is urged toward the respective disc 106, the respective Bellville washers 102 and 104 are further loaded so that they function to bias the respective clamping arm assembly 70 toward the clamping surface 34 and the respective slide member assembly 74 toward the respective clamping surface 60 in a manner which will hereinafter be more fully described.

Each of the slide member assemblies 74 comprises an enlarged washer 110 having a central opening with a dimension which is somewhat greater than the sectional dimension of the body 68, a slide ring 112, and a return spring 114. The washers 110 and the slide rings 112 are slidably received on the respective bodies 68, and they are positioned so that the washers 110 are in engagement with the clamping surfaces 60 and the slide rings 74 are in face-to-face engagement with the respective washers 110. The slide rings 74 are each formed with a pair of arcuate notches 116 in diametrically opposite portions of the respective sides thereof which face away from the respective washers 110. As illustrated most clearly in FIG. 10, the slide rings 112 are formed with beveled inner surfaces 118 which extend angularly outwardly toward the opposite sides of the respective slide rings 112 so that the respective bodies 68 can be tilted in the slide rings 112 while the slide rings 112 are in face-to-face engagement with the respective washers 110. As illustrated in FIG. 5, reduced bores 120 extend inwardly from the side walls of the slide rings 112, and the return spring 114 are received in the bores 120 so that they project outwardly from the slide rings 112 and engage the lower inner surface of the shoulder ring 40. Accordingly, although the slide rings 112 are slidably received on the respective bodies 68 and the bodies 68 can be tilted slightly with respect to the slide rings 112, the return springs 114 operate to return the bodies 68 to positions wherein the central axes thereof are substantially perpendicular to the respective clamping surfaces 60 and the surface 34.

The actuating assemblies 76 each comprises an actuator pin 122, an actuator yoke generally indicated at 124, and a stop member 126, and they are operative for loading the respective spring assemblies 72 to bias the respective clamping arm assemblies 70 toward the respective slide member assemblies 74. The pins 122 comprise substantially circular pins, and they have diameters which are less than the diameters of the respective apertures 84. The pins 122 are loosely received in the respective apertures 84 so that they are movable slightly in directions which are substantially parallel to the axes of the respective bodies 68. The pins 122 are positioned in the bodies 68 so that they are in engagement with the respective discs 100, and preferably the spring assemblies 72, the apertures 84, and the pins 122 are disposed and dimensioned so that the spring assemblies 72 bias the pins 122 toward positions of engagement with the walls of the portions of the apertures 84 which are closest to the respective clamping arm assemblies 70. The yokes 124 each comprise a substantially semicircular yoke element 128 having a pair of spaced legs 130, a lever arm 132 which is attached to the yoke element 128, and a pair of toggle elements 134 which are attached to the terminal ends of the legs 130. The yoke elements 128 are dimensioned so that the respective legs 130 thereof are receivable on opposite sides of the respective main body portions 78, and the toggle elements 134 are disposed in substantially transverse relation to the respective legs 130 and have first and second rounded knobs 136 and 138 at the opposite extremities thereof. The lever arms 132 project outwardly from the central portions of the yoke elements 128 and terminate in a rounded balls 140. The yokes 124 are assembled on the opposite sides of the main body portions 78 from the stop members 126 with the first toggle member knobs 136 received in the rounded notches 116 in the slide rings 112, and the second rounded toggle member knobs 138 disposed in engagement with the surfaces of the pins 122. Further, the yokes 124 are dimensioned and configured so that as the knobs 138 cam on the surfaces of the respective pins 122, they urge the pins 122 toward the respective Bellville washers 102 and 104. Hence, as the lever arms 132 are manipulated to cause the second toggle member knobs 138 to cam on the pins 122, the respective washers 102 and 104 are compressed so that the respective bodies 68 are thereby urged through the respective slide members 74 and the clamping arms 70 are biased to positions of engagement with the clamping surface 34, whereas the first toggle member knobs 136 engage the slide rings 112 to bias the slide member assemblies 74 toward the receiver clamping surfaces 60.

The clamps 12 are received in the compartments 52 so that the lower skirt portions 80 of the clamps 12 are disposed in the respective recesses 56 in the bottom wall 44. Positioning springs 142 are provided in the central recesses 57 and engage the adjacent discs 106 for positioning the ends of the respective skirt portions 80 in slightly spaced relation to the bottom walls of the respective recess 56. When the clamps 12 are received in the compartments 52 in this manner, they are positioned so that the washers 110 engage the respective clamping surfaces 60, and the main portions 78 of the bodies 68 extend through the respective washers 110 and project distances into the respective apertures 58 in the second end wall 46. Further, the opposite terminal portions of the pins 122 are received in the adjacent slots 54 to guide the travel of the clamps 12 in the compartments 52. The apertures 58 have elongated sectional dimensions as hereinabove noted, and they are disposed so that when the respective bodies 68 which are received therein are in position wherein the axes thereof are substantially perpendicular to the respective clamping surfaces 60, the main body portions 78 engage the walls of the respective apertures 58 as at 144. Further, the respective springs 114 bias the rings 112 and the bodies 68 to this position. However, when the clamping members 70 are disengaged from the clamping surfaces 34 and from the shoulder rings 40, the entire clamps 12 can be tilted or pivoted slightly on the respective springs 142 about the axes of the pins 122 to move the clamping arms 96 to positions wherein they are inwardly offset from the respective clamping surfaces 34.

The drive assembly 17 which is illustrated in FIGS. 5 through 9 is operative for simultaneously manipulating the lever arms 132 of the clamps 12 to simultaneously move the clamps 12 between the unclamped, clamped and locked positions thereof. The drive assembly 17 comprises a hydraulic cylinder 146 which is preferably of substantially circular configuration and has an annular mounting ring 148 secured thereto. The mounting ring 148 is dimensioned to be received in the substantially circular opening 48 defined by the shoulder ring 40, and it is secured to the ring 40 by suitable means, such as screws or the like (not shown). The drive assembly 17 further comprises a piston element 150 which is received in the cylinder 146 and a substantially circular drive member 152 which extends integrally from the piston member 150 and has an annular channel 154 wherein the balls 140 of the lever arms 132 are received. The drive assembly 17 is operative as a conventional hydraulic piston-cylinder assembly for moving the piston 150 and the drive member 152 in substantially parallel relation to the axis of the coupling 10 to operate the actuating assemblies 76 of the clamps 12. Accordingly, for operation of the drive assembly 17, the cylinder 146 is connected to a supply of pressurized hydraulic fluid to effect movement of the piston element 150 and the drive member 152 in a conventional manner. Further, while the drive assembly 17 as herein embodied comprises a hydraulically operated assembly, the use of other types of drive assemblies, such as mechanically operated assemblies in the coupling 10, is contemplated.

Figure 8:
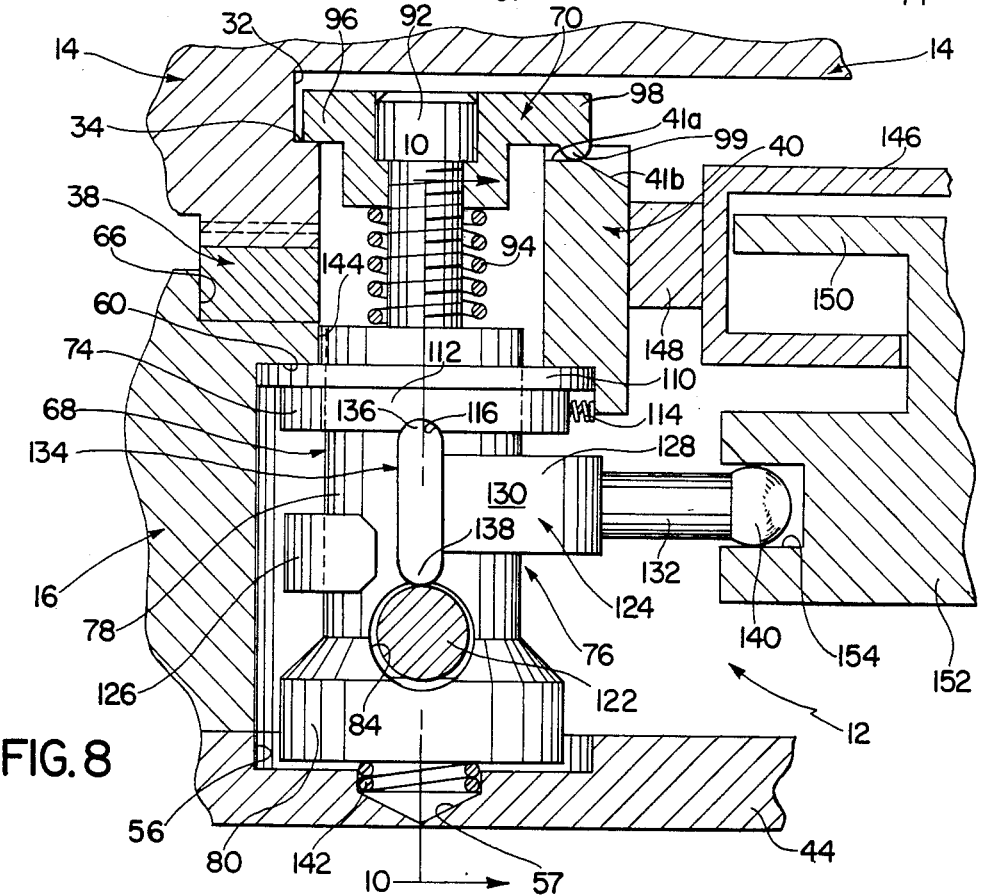
Figure 9:
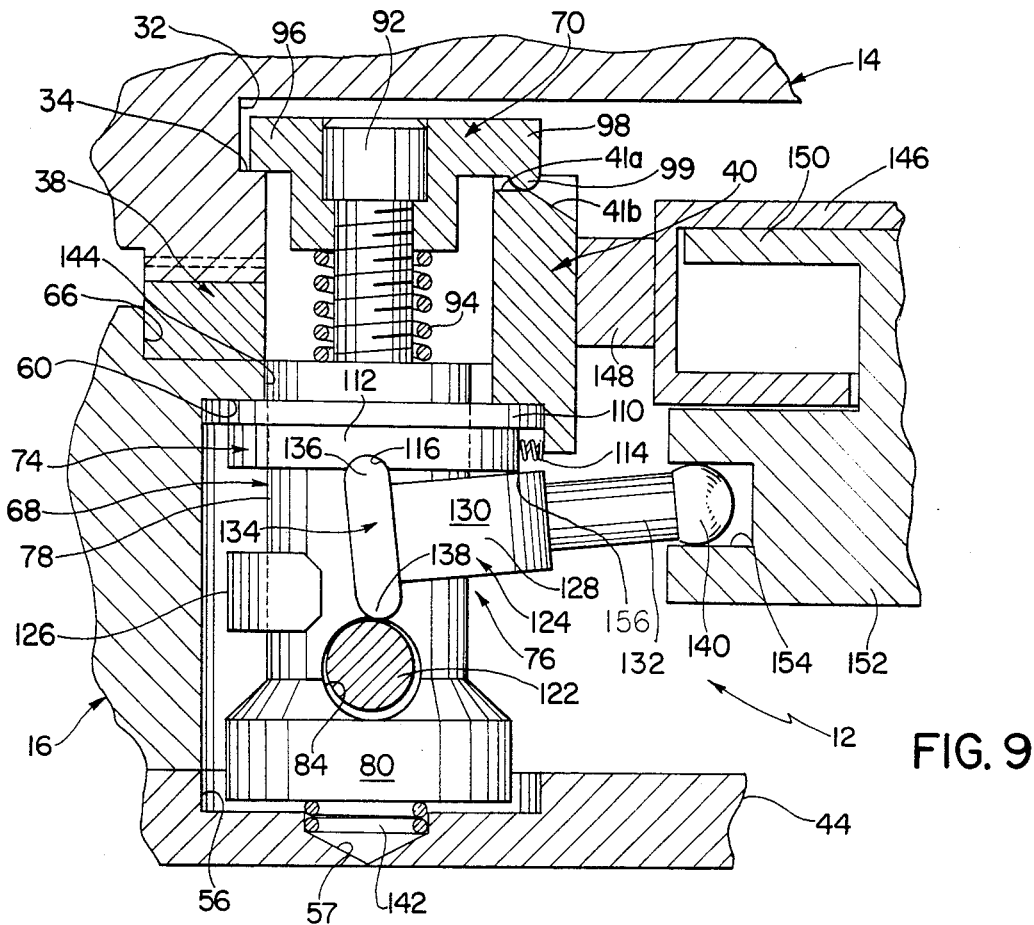

The sequential operation of one of the clamps 12 is illustrated in FIGS. 5 through 9. In order for the carrier 14 to be assembled on or disassembled from the receiver 16, the clamping arms 96 must be disengaged from the clamping surface 34, and the arms 96 must be moved inwardly in the coupling 10 so that they are disposed inwardly from the channel 32. By moving the lever arms 132 of the actuating assemblies 76 to the farthest positions thereof toward the first end wall 44, the clamps 12 are pivoted to the inwardly offset positions illustrated in FIG. 5. As will be noted, when the clamps are in this position, the clamping arms 96 are disengaged from the clamping surface 34, and the arms 96 are withdrawn from the channel 32. As will be further noted, as the clamps 12 are moved to this position, the respective toggle members 134 thereof engage the respective stop members 126 so that the toggle members 134 are pivoted about the points of engagement of the respective second knobs 138 thereof with the respective pins 122 to effect toggle actions in the clamps 12 which move the respective slide rings 112 inwardly in the receiver 16 and thereby tilt the clamps 12 inwardly so that they pivot on the respective positioning springs 142 about the axes of the respective pins 122. The beveled surfaces 41b of the shoulder ring 40 allow the clamping assemblies 90 to be pivoted without causing the knobs 99 to engage the shoulder ring 40, and the elongated apertures 58 provide clearance for the upper portions of the bodies 68 to be pivoted. The clamps 12 are returned to the position illustrated in FIG. 6 wherein the axes thereof are substantially parallel to the axis of the receiver 16 by moving the lever arms 132 upwardly slightly away from the end wall 44. As the clamps 12 are pivoted to this position, the return springs 114 urge the bodies 68 toward the outer portions of the respective apertures 58, and the second ends 138 of the toggle members 134 pivot on the pins 122 during movement of the clamps 12. The cylindrical main portions 78 of the bodies 68 engage the respective openings 58 as at 144 to limit the outward pivotal movement of the clamps 10 to positions wherein they are substantially parallel to the axis of the coupling 10. When the clamps 12 are in this position and the carrier 14 is received on the receiver 16, the clamping arms 96 are in substantially aligned spaced disengagement from the clamping surface 34. By further pivoting the lever arms 132 away from the first end wall 44, the clamps 12 are moved from the position illustrated in FIG. 6 to the position illustrated in FIG. 7, wherein the clamping arms 96 thereof are in engagement with the clamping surface 34 of the receiver 14. In this regard, as the lever arms 132 are moved from the position illustrated in FIG. 6 to the position illustrated in FIG. 7, second toggle actions take place between the toggle members 134 and the slide rings 112. More specifically, the first knobs 136 of the toggle members 134 pivot in the notches 116 in the slide rings 112; and as the second knobs 138 travels over the surfaces of the respective pins 122, the bodies 68 are drawn through the respective rings 112 so that the respective skirt portions 80 are moved further into the respective recesses 56 and so that the respective clamping arms 96 engage the surface 34. As will be noted, this position is reached before the toggle members 134 reach the uppermost portions of the pins 126. The clamps 12 are then moved to the position illustrated in FIG. 8 by pivoting the lever arms 122 farther away from the end wall 44 to load the Bellville washers 102 and 104 and thereby bias the clamping arms 96 toward the surfaces 34 and bias the slide member assemblies 74 toward the surfaces 60. In this regard, as the lever arms 132 are pivoted in this manner, the second knobs 138 are moved to the uppermost points on the respective pins 122 to urge the respective pins 122 downwardly in the respective apertures 84 to bias the respective Bellville washers 102 and 104, as illustrated in FIGS. 8 and 10. It should also be pointed out that when, as in the preferred embodiment, the Bellville washers 102 and 104 are permanently maintained in partially loaded or "pre-loaded" dispositions in the spring assemblies 72, they are loaded even further as the lever arms 132 are pivoted to the position illustrated in FIG. 8 so that the forces which are applied to the surfaces 34 and 60 result from the total loadings on the washers 102 and 104. The lever arms 132 are then pivoted still further to move the clamps 12 to the locked positions thereof illustrated in FIG. 9. As the lever arms 132 are pivoted to this position, the second knobs 138 of the toggle members 134 pass over the tops of the respective pins 122 and are locked in the position illustrated in FIG. 9, wherein the Bellville washers 102 and 104 are still biased by the actuating assemblies 76, but the yokes 124 engage the respective rings 112 as at 156 to prevent further pivoting of the respective lever arms 132 so that the actuating assemblies are locked into position. Accordingly, even in the event of a power failure, the carrier 14 will remain in biased engagement with the receiver 16 so that the coupling 10 is retained in the coupled position.

It is seen, therefore, that the instant invention provides an effective coupling construction and an effective clamp for the coupling. The compact configuration of the coupling makes it particularly attractive for use in work-holding systems, since it does not occupy substantial portions of the machining envelope of a machining apparatus. Further, the clamps 12 are operative for applying clamping pressures along clamping axes which are substantially perpendicular to and intersect the respective clamping surfaces to maintain the surfaces in biased engagement. In addition, the unique double-toggle actions of the clamps 12 make them effectively operative for moving between several positions by manipulating the clamping arms 132 in a single direction. Accordingly, for these reasons, as well as the other reasons hereinabove set forth, it is seen that the coupling and clamp of the instant invention represent significant advancements in the art which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A clamping device for securing a first member and an adjacent second member in a clamped position, said first and second members having clamping surfaces thereon which face generally away from one another when said first and second members are in said clamped position and being securable in said clamped position by the application of clamping forces to the clamping surfaces thereof, said clamping device comprising:
    a. a clamp body having a central axis;
    b. a clamping member attached to said body and extending generally outwardly with respect to said axis;
    c. a slide member mounted on said body so that it is slidable a distance with respect thereto in a direction substantially parallel to said axis;
    d. said clamping device being positionable in an engaged position adjacent said first and second members wherein said clamping member is in engagement with said first member clamping surface and said slide member is in engagement with said second member clamping surface;
    e. spring means attached to said body, operable substantially along the longitudinal axis thereof; and
    f. actuating means communicating with said slide member and said spring means, and operable for loading said spring means when said device is in the engaged position thereof to bias said slide member toward said clamping member and to thereby bias said first member toward said second member.

2. The device of claim 1, further comprising positioning means engaging said body and communicating with said slide member through said actuating means for maintaining said slide member in engagement with said second member clamping surface.

3. In the device of claim 2, said actuating means further characterized as being operative for moving said clamping member from a position of substantially aligned spaced disengagement from said first member clamping surface to a position of engagement therewith before loading said spring means.

4. In the device of claim 1, said actuating means comprising a lever arm which is pivotable for effecting said spring means loading.

5. In the device of claim 3, said actuating means comprising a lever arm which is pivotable for effecting said clamping member movement and further pivotable in substantially the same direction for effecting said spring means loading.

6. In the device of claim 3, said actuating means further characterized as being operative for moving said clamping member from a position wherein it is laterally offset from said first member clamping surface to said position of substantially aligned spaced disengagement.

7. In the device of claim 6, said actuating means comprising a lever arm which is movable in a single direction for sequentially moving said clamping member from said offset position to said position of spaced disengagement to said engaged position and for loading said spring means.

8. In the device of claim 7, said body being pivotable for moving said clamping member between said offset position and said position of spaced disengagement.

9. In the device of claim 1, said spring means further characterized as comprising a Belville washer.

10. In the device of claim 8, said actuating means further characterized as being pivotable about a first pivot axis which is substantially transverse to said body for moving said clamping member from the offset position thereof to said position of spaced disengagement, and being pivotable about a second axis which is substantially parallel to and spaced from said first pivot axis for moving said clamping member from said position of spaced disengagement to said engaged position and also for effecting said spring means loading.

11. In the device of claim 10, said actuating means comprising a yoke element having a pair of spaced legs which are received adjacent opposite sides of said body, said lever arm being attached to said yoke element, said legs having enlarged toggle members secured to the terminal ends thereof, said toggle members each having first and second spaced toggle knobs thereon, said first toggle knobs communicating with said slide member for moving said clamping member from said laterally offset position to said position of spaced disengagement, said second toggle member knobs communicating with said body through said spring means for moving said clamping member from said position of spaced disengagement to said engaged position and for loading said spring means.

12. In the device of claim 11, said body having an enlarged substantially transverse aperture therethrough, said actuating means further comprising an elongated pin, said pin having a smaller sectional dimension than said aperture and being loosely received therein, said pin communicating with said spring means, said toggle member second knobs camming on the surface of said pin to move said clamping member to the engaged position and to load said spring means.

13. In the device of claim 1, said spring means further characterized as being permanently preloaded to a partial extent, said actuating means further characterized as being operable for further loading said spring means to bias said slide member toward said clamping member with the entire loading of said spring means.

14. A coupling construction comprising:
 a. a receiver having a coupling surface thereon and a clamping surface which faces generally opposite said receiver coupling surface;
 b. a carrier having a coupling surface thereon and a clamping surface which faces generally opposite said carrier coupling surface, said receiver and carrier coupling surfaces being of substantially complimentary configurations and being received in mating relation;
 c. a clamp for releasably securing said receiver and said carrier in a coupled position wherein the coupling surfaces thereon are in mating relation, said clamp comprising:
  i. a clamp body having a central axis;
  ii. a clamping member attached to said clamp body and extending generally outwardly with respect to said axis;
  iii. a slide member mounted on said clamp body so that it is slidable a distance with respect thereto in a direction substantially parallel to said axis;
  iv. spring means attached to said clamp body operable substantially along the longitudinal axis thereof;
  v. means operable for positioning said clamp body so that said slide member is in engagement with one of said clamping surfaces and so that said clamping member is engageable with the other of said clamping surfaces;
  vi. actuating means communicating with said slide member and said spring means and operable for loading said spring means when said clamping member is in engagement with said other of said clamping surfaces to bias said carrier toward said receiver and to thereby maintain said coupling surfaces in biased engagement.

15. In the coupling construction of claim 14, said clamp being operable for applying clamping forces to said receiver and said carrier along a clamping axis which is substantially perpendicular to and intersects said coupling surfaces.

16. In the coupling construction of claim 15, said coupling surfaces further characterized as complimentary multitoothed coupling surfaces.

17. The coupling construction of claim 15 further characterized as being substantially circular and having a central open area, said coupling construction further comprising a plurality of said clamps, each operative along a different clamping axis, said carrier and said receiver each having a plurality of clamping surfaces thereon, said clamps being disposed in spaced relation in said open area, the clamping members of said clamps extending outwardly from said open area.

18. The coupling construction of claim 17 further comprising drive means interconnected to the actuating means of said clamps for simultaneously actuating all of said actuating means to bias the spring means of all of said clamps.

19. In the coupling construction of claim 17, said actuating means further characterized as being operative for moving the respective clamps from positions wherein the respective clamping members thereof are inwardly offset from the respective clamping surfaces to positions wherein the respective clamping members are substantially aligned with the respective clamping surfaces substantially along the respective clamping axes and for thereafter moving the respective clamping members to positions of engagement with the respective clamping surfaces.

20. In the coupling construction of claim 19, the actuating means of each of said clamps having first and second pivot axes and being pivotable about the respective first pivot axes for moving the respective clamps between the respective positions thereof wherein the respective clamping members thereof are inwardly offset from the respective clamping surfaces and positions thereof wherein the respective clamping members thereof are in substantially aligned spaced disengagement from the respective clamping surfaces thereof and being pivotable about the respective second pivot axes for moving of the respective clamps between positions thereof wherein the respective clamping members thereof are in substantially aligned spaced disengagement from the respective clamping surfaces thereof and positions wherein the respective clamping members are in substantially nonbiased engagement with the respective clamping surfaces and also pivotable about the respective second pivot axes for loading the respective spring means of said clamps once the respective clamping members thereof are in engagement with the respective clamping surfaces.

21. In the coupling construction of claim 17, said open area being at least partially disposed in said receiver, said clamps being mounted at least partially in the portion of said open area which is disposed in said receiver, said positioning means comprising said receiver.

22. In the coupling construction of claim 21, said positioning means further comprising a plurality of biasing means communicating with said receiver and with said clamp bodies for positioning said slide members in engagement with the respective receiver clamping surfaces.

23. In the coupling construction of claim 21, said receiver further characterized as having a plurality of clamping shoulders thereon, each of said shoulders being adjacent to and facing in generally the same direction as one of the clamping surfaces on said carrier, said clamping members further characterized as each extending between the respective clamping surfaces and an adjacent shoulder to apply clamping pressure substantially along the respective clamping axes.

24. In the coupling construction of claim 23, said actuating means being operable for moving the respective clamps so that the clamping members thereof are inwardly offset from the respective clamping surfaces and disengaged from the respective shoulders to permit the disengagement of said carrier from said receiver.

25. In the coupling construction of claim 14, said carrier being operative for holding a workpiece, said receiver being securable at a work station for performing work on said work piece.

26. In the coupling construction of claim 22, said receiver having a plurality of recesses therein which face generally toward said carrier and communicate with said open area, the end portions of said clamp bodies which are farthest from said carrier being disposed in said recesses, said biasing means being disposed in said recesses and communicating with the respective bodies and with said receiver in said recesses for positioning said clamps so that the slide members thereof are in engagement with the respective receiver clamping surfaces.

27. In the coupling construction of claim 20, said clamps further comprising return spring means outwardly biasing said clamps to positions wherein the clamping members thereof are substantially in alignment with the respective clamping surfaces of said carrier.

28. In the coupling construction of claim 14, said spring means further characterized as being permanently preloaded to a partial extent, said actuating means further characterized as being operable for further loading said spring means to bias said carrier toward said receiver with the entire loading of said spring means.

29. A clamping device for securing a first member and an adjacent second member in a clamped position, said first and second members having clamping surfaces thereon which face generally away from one another when said first and second members are in said clamped position and being securable in said clamped position by the application of clamping forces to the clamping surfaces thereof, said clamping device comprising:
  a. a clamp body having a central axis;
  b. a clamping member attached to said body and extending generally outwardly with respect to said axis;
  c. a slide member mounted on said body so that it is slidable a distance with respect thereto in a direction substantially parallel to said axis;
  d. said clamping device being positionable in an engaged position adjacent said first and second members wherein said clamping member is in engagement with said first member clamping surface and said slide member is in engagement with said second member clamping surface;
  e. spring means attached to said body, actuable for biasing said movable member toward said clamping member;
  f. means for actuating said spring means, when said device is in the engaged position thereof to bias said slide member toward said clamping member and to thereby bias said first member toward said second member.

30. The device of claim 29 further comprising positioning means operable for positioning said clamp body so that said movable member is maintained in engagement with said second member clamping surface.

31. A coupling construction comprising:
  a receiver securable at a work station and having a coupling surface thereon;
  b. a carrier adapted for receiving and securing a workpiece thereon and having a coupling surface thereon, said receiver and said carrier coupling surfaces being of substantially complimentary configurations and being receivable in mating relation for securing said workpiece at said work station; and
  c. means actuatable for releasably securing said receiver and said carrier in biased engagement in a coupled position wherein the coupling surfaces thereon are in mating relation, said securing means being operative by applying clamping pressures to said carrier and said receiver along a clamping axis which substantially intersects said receiver and carrier coupling surfaces when said receiver and said carrier are in said coupled position.

32. In the coupling construction of claim 31, said clamping axis being generally perpendicular to said receiver and carrier coupling surfaces.

33. In the coupling construction of claim 31, said securing means being operative by applying clamping pressures along a plurality of clamping axes which substantially intersect said receiver and carrier coupling surfaces.

34. The coupling construction of claim 33 further characterized as having a central axis, said clamping axes being substantially parallel to said coupling axis, said receiver and said carrier cooperating to define a central open interior area in said coupling, said coupling axis extending through said open interior area, said securing means being disposed substantially in said central open interior area, said receiver and carrier coupling surfaces being disposed radially outwardly from said open interior area.

35. The coupling construction of claim 31 further characterized as having a central axis, the longitudinal dimension of said coupling with respect to said central axis being not substantially greater than the transverse dimension thereof with respect to said central axis.

36. A coupling construction comprising:
  a. a receiver having a coupling surface thereon;
  b. a carrier having a coupling surface thereon, said receiver and carrier coupling surfaces being of substantially complimentary configurations and being receivable in mating relation;
  c. a clamp for releasably securing said receiver and said carrier in a coupled position wherein the coupling surfaces thereof are in mating relation, said clamp comprising:
    i. a clamp body having a central axis;
    ii. a movable member mounted on said clamp body so that it is movable a distance with respect thereto in a direction substantially parallel to said axis;
    iii. means mounting said clamp body on one of said receiver or said carrier so that said movable member is engageable with the other one of said receiver or said carrier when said carrier and said receiver are in the coupled position;
    iv. spring means actuatable for biasing said movable member toward said one of said carrier or said receiver with which it is engageable; and
    v. actuating means communicating with said movable member and said spring means and operable for loading said spring means when said movable member is positioned in engagement with said one of said carrier or receiver with which it is engageable to bias said carrier toward said receiver and to thereby maintain said coupling surfaces in biased engagement.

* * * * *